Dec. 1, 1964 W. DU BROFF 3,159,380
HAND PALLET TRUCK
Filed June 12, 1963 2 Sheets-Sheet 2
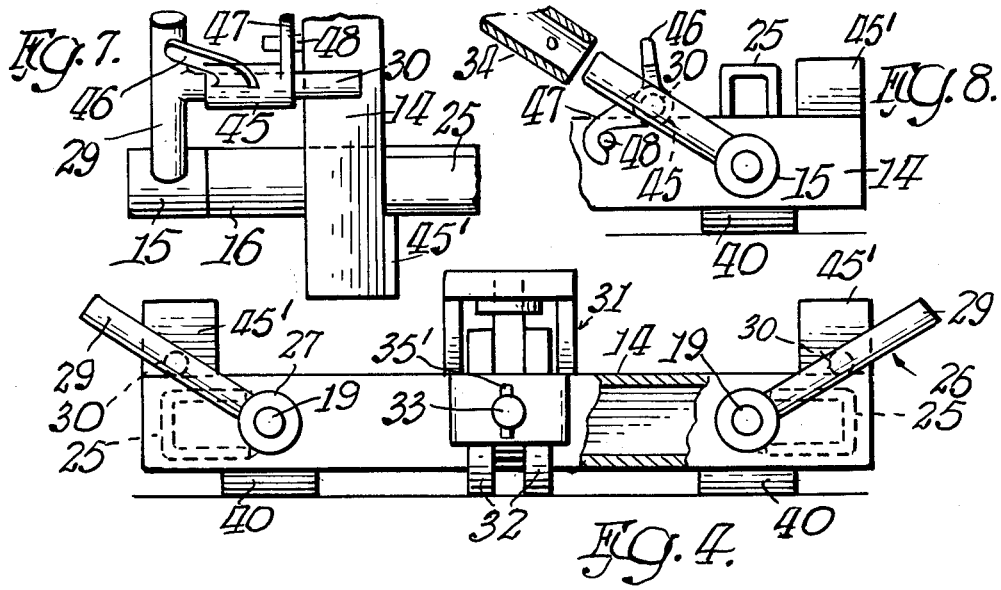
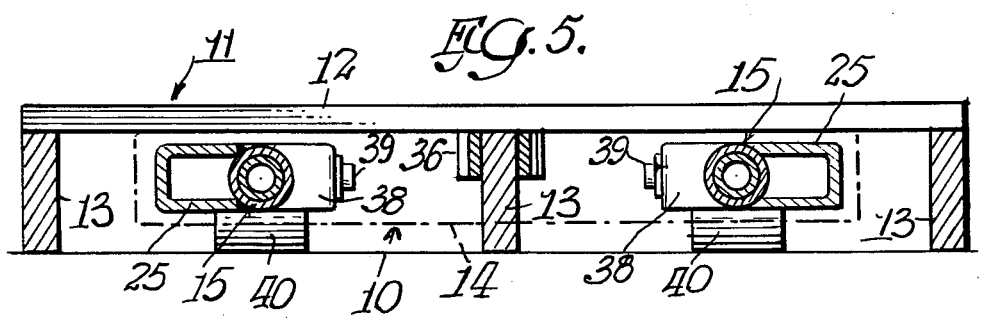
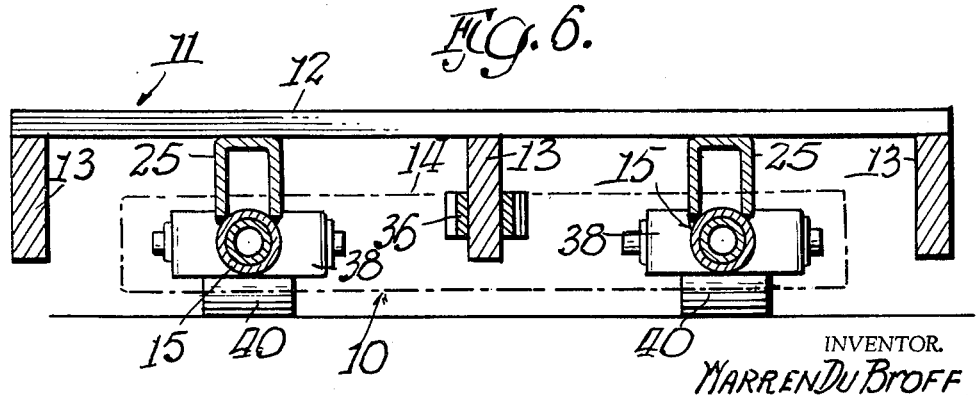
INVENTOR.
WARREN DU BROFF United States Patent Office 3,159,380
Patented Dec. 1, 1964

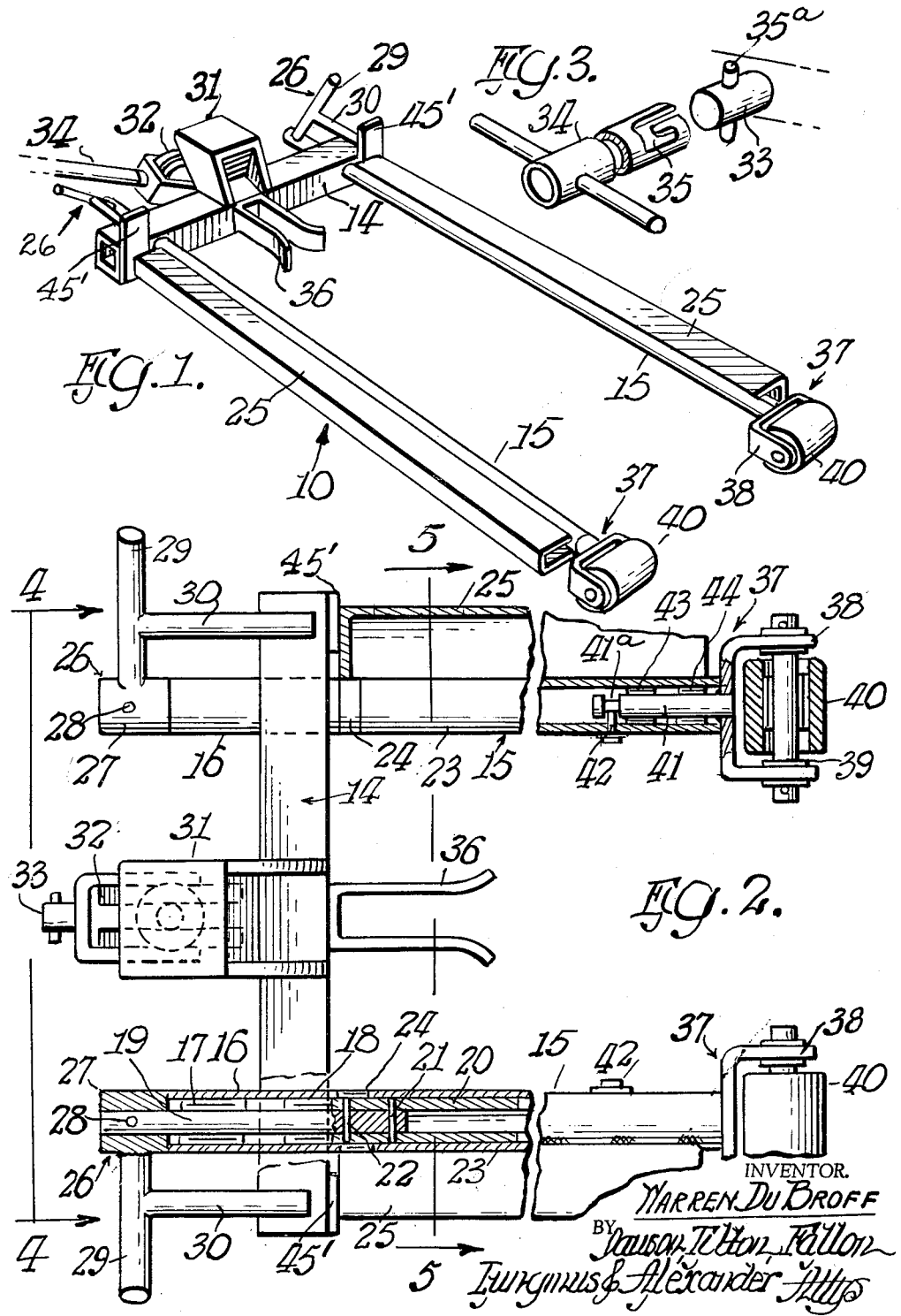

3,159,380
HAND PALLET TRUCK
Warren Du Broff, 550 Carol Court, Highland Park, Ill.
Filed June 12, 1963, Ser. No. 287,321
12 Claims. (Cl. 254—8)

This invention relates to a hand pallet truck and, more particularly, to a mobile device of simple yet rugged construction for relocating pallets.

The invention finds particular utility in connection with "single face" pallets, i.e., a wooden platform having the cross slats on only one side of the skids. In the past, devices for relocating skid-type pallets have not only been expensive but cumbersome and complicated. The combination of these three disadvantages has precluded many small businesses from having a fluid or mobile inventory. The provision of a truck that overcomes these disadvantages constitutes an important object of the invention.

Another object is to provide a hand-operated pallet truck wherein unique rotatable members are provided for the purpose of elevating the skid-type pallet.

Other objects and advantages of the invention may be seen in the details of construction and operation set down in this specification.

The invention is described in conjunction with an illustrated embodiment in the accompanying drawing, in which:

FIG. 1 is a fragmentary perspective view of the inventive truck;

FIG. 2 is a fragmentary top plan view, partially in section;

FIG. 3 is a fragmentary perspective view of the extreme left-hand portion of FIG. 1;

FIG. 4 is an end elevational view in reduced scale as seen along the sight line 4—4 of FIG. 2;

FIG. 5 is a sectional view on the line 5—5 of FIG. 2;

FIG. 6 is a view similar to FIG. 5 but with the parts in a different operating condition;

FIG. 7 is a fragmentary plan view on enlarged scale of a portion of the apparatus equipped with special latching means; and FIG. 8 is a side elevational view of the construction seen in FIG. 7.

In the illustration given, the numeral 10 designates generally the inventive truck which is seen to be used in conjunction with a skid-type pallet (see FIGS. 5 and 6). The pallet is generally designated 11 and is made up of a plurality of skids 13 connected to a platform 12. The platform 12 usually includes a plurality of cross members (not shown).

The truck 10, as seen particularly in FIGS. 1 and 2, includes a crossbar 14 which may be a square beam. Extending perpendicularly to the length of the crossbar 14 are a pair of pallet-supporting legs 15. The legs 15 are rotatably supported on the crossbar 14 to pivot between the FIG. 5 and FIG. 6 showings for the purpose of elevating the pallet 11.

For this purpose, the crossbar 14 is equipped with a sleeve 16 associated with each leg 15. Supported within each sleeve 16 are a pair of roller bearings 17 and 18 so as to provide journals for a shaft 19. The shaft 19 is the element employed to rotate the legs 15 and, for this purpose, is pinned to a sleeve 20 by means of pins 21 and 22 (seen only in FIG. 2 and in the extreme lower central portion thereof). The numeral 23 designates an outer sleeve press fitted to the inner or reinforcing sleeve 20. A roller bearing 24 is interposed between the end of the stationary sleeve 16 and the adjacent end of the outer sleeve 23. Thus, as the shaft 19 is rotated, this movement is conducted through the pins 21 and 22 to the sleeves 20 and 23.

To convert the rotary motion of the outer sleeves 23 into the camming or lifting action pictured in FIGS. 5 and 6, each leg 15 includes a camming channel 25. In FIG. 5, for example, the channel 25 is seen to be disposed generally horizontally while in FIG. 6 the leg 15 has been rotated 90 degrees to position the channel vertically.

For the purpose of rotating the shaft 19 and hence the associated channel 25, a lever generally designated 26 includes a collar portion 27 pinned to the shaft 19 by means of a pin 28. The lever 26 also includes an arm 29 extending transversely of the shaft 19, with the arm 29 being equipped with an integral limiting stud 30. The stud 30 is adapted to bear against the upper surface of the crossbar 14, as can be appreciated from a consideration of FIGS. 4 and 6.

To provide the truck 10 with movability, the crossbar 14 is equipped with a yoke 31 rotatably and pivotally supporting a double caster 32. The yoke 31 is equipped with a stud projection (see FIG. 3) for coupling to a handle 34. The handle 34 is removably connected to the stud 33 by means of the bayonet slot 35 and projecting pin 35a.

The crossbar 14 also carries a guide channel 36 which, as seen in FIG. 5, serves to receive one of the skids 13.

The ends of the legs 15 remote from the crossbar 14 are equipped with wheel assemblies generally designated 37. In FIG. 2, it is seen that the wheel assembly 37 includes a yoke 38—the yoke 38 carrying an axle 39 equipped with a wheel 40. The yoke 38 has a projecting stud 41 annularly recessed as at 41a, to receive a lock screw 42. The lock screw 42 thus confines the wheel assembly 37 in place within the tubular sleeve 23. The numerals 43 and 44, as seen in FIG. 2, designate bearings for the stud 41, permitting the wheel 40 to remain in place in a given position while the sleeve 23 is rotated through the 90° arc mentioned previously.

In FIGS. 7 and 8, a latching device is shown which is advantageous in maintaining the camming channel 25 in a load-carrying position. The latching device includes a sleeve-like member 45 rotatably mounted on the limiting stud or stop element 30. The sleeve-like member 45 is equipped with a handle 46 and a laterally projecting latch 47. In the condition seen in FIGS. 7 and 8, the hook-shaped latch 47 is in engagement with a latching pin 48 projecting laterally from the crossbar 14. The engagement of the latch 47 with the pin 48 is relieved by rotating the sleeve-like member 45 about its own axis, as by turning the handle 46. In FIG. 8, this is seen to be achieved through the installation of the T-shaped handle 34 on the arm 29. On the other hand, attempted rotation of the leg 15 is ineffective to provide this disengagement since this, in effect, attempts to rotate the sleeve-like member 45 about the axis of the leg 15 rather than about the axis of the sleeve-like member 45.

In the operation of the device, the handle 34 is removably connected to the stud 33 and the legs 15 are introduced under a skid-type pallet, the guide 36 aiding to center the truck 10 by engaging the central skid 13. The extent to which the truck is inserted under the pallet is limited by the provision of upstanding clips 45' on the crossbar 14.

When the truck is properly positioned through the function of the clips 45' and the guide 36, the handle 34 is removed from the stud 33 and is mounted on one of the arms 29. This provides significantly greater leverage to move a given arm 29 from the position of FIGS. 4 and 5 to the position of FIG. 6. Thereafter, the handle 34 is removed from the first arm 29 and the same operation performed relative to the second arm 29. Thereafter, the handle 34 is removed from the second arm 29 and returned to its position on the stud 33 whereupon the pallet is available for relocation.

Upon relocation, the truck is removed by first applying the handle 34 to each of the arms 29 to release the latch 47 from the associated pin 48, permitting rotation of the associated leg 15 through the 90° arc indicated.

While in the foregoing specification a detailed description of an embodiment of the invention has been set down for the purpose of explanation, many variations in the details herein given may be made by those skilled in the art without departing from the spirit and scope of the invention.

I claim:

1. A pallet truck for skid-type pallets comprising an elongated transverse bar equipped with wheel means centrally thereof, a pair of longitudinally extending pallet-supporting legs rotatably secured at one end of each leg to said bar adjacent the bar ends to define a generally C-shaped frame, a wheel carrier rotatably secured to the other end of each leg, a wheel carried by each of said carriers, each leg being equipped along the major portion of its length with a laterally extending portion adapted to elevate a pallet when said leg is rotated relative to said bar, handle means coupled to said bar, and means for selectively rotating said legs.

2. The truck of claim 1 in which said rotating means includes a lever arm coupled to said one end of each leg, each lever arm being equipped with a laterally extending stop element for engaging said bar to limit the rotation of its associated leg.

3. The truck of claim 1 in which each leg includes a generally cylindrical member rotatable about the axis thereof, said laterally extending portion including a channel secured to said cylindrical member.

4. The truck of claim 1 in which each of said lever arms and handle means includes a stub shaft, a handle slidably engageable with all of said shafts and means for releasably locking said handle to the stub shaft of said handle means.

5. A hand pallet truck comprising a generally C-shaped frame defined by parallel legs and a crossbar connecting said legs at corresponding ends thereof, a shaft extending through said bar for each leg and journaled in said bar, each leg being coupled to its shaft for common rotation therewith, a wheel rotatably mounted on said bar between said shafts, a wheel rotatably and pivotally supported on each leg at the unattached end thereof, each leg including a cam surface engageable with the underside of a pallet upon rotation of said shaft, and means for manually moving said truck.

6. A hand pallet truck comprising a generally C-shaped frame defined by parallel legs and a crossbar connecting said legs at corresponding ends thereof, a shaft extending through said bar for each leg and journaled in said bar, each leg being coupled to its shaft for common rotation therewith, a wheel rotatably mounted on said bar between said shafts, a wheel rotatably and pivotally supported on each leg at the unattached end thereof, each leg including a cam surface engageable with the underside of a pallet upon rotation of said shaft, a shaft coupled to said crossbar for pulling or pushing said truck, and a tubular handle selectively engageable with each of said shafts for rotating said legs and pulling said truck.

7. The truck of claim 6 in which said bar is equipped with upstanding ears for limiting the insertion of said truck beneath a pallet.

8. The truck of claim 6 in which said bar is equipped with spaced-apart guide elements extending generally parallel to said legs for engaging the center brace of a pallet.

9. A hand pallet truck comprising a generally C-shaped frame defined by parallel legs and a crossbar connecting said legs at corresponding ends thereof, a shaft extending through said bar for each leg and journaled in said bar, each leg being coupled to its shaft for common rotation therewith, a wheel rotatably mounted on said bar between said shafts, a wheel rotatably and pivotally supported on each leg at the unattached end thereof, each leg including a cam surface engageable with the underside of a pallet upon rotation of said shaft, each leg including a cylindrical member fixed to its associated shaft, the associated shaft projecting beyond said crossbar and equipped with an L-shaped lever assembly, said lever assembly being rotatable through an arc of about 90 degrees for changing the position of said cam surface, said crossbar between said shafts being equipped with guide means for engaging the center brace of a pallet and with a pedestal for pivotally and rotatably supporting the first-mentioned wheel, said pedestal being equipped with a stub shaft for releasable engagement with an elongated handle adapted to propel said truck.

10. The truck of claim 9 in which each L-shaped lever assembly includes a stop element extending parallel to the length of said legs for engaging said crossbar to limit the rotation of the leg associated with a lever assembly.

11. The truck of claim 10 in which lock means are provided on each stop element, said lock means including a latch pivotally mounted on its associated stop element, and a pin on said crossbar engageable with said latch, pivoting of said latch on said stop element being operative to disengage said latch from said pin.

12. A pallet truck for skid-type pallets comprising an elongated transverse bar equipped with wheel means centrally thereof, a pair of longitudinally extending pallet-supporting legs rotatably secured at one end of each leg to said bar adjacent the bar ends to define a generally C-shaped frame, a wheel carrier rotatably secured to the other end of each leg, a wheel carried by each of said carriers, each leg being equipped along the major portion of its length with a laterally extending portion adapted to elevate a pallet when said leg is rotated relative to said bar, handle means coupled to said bar, means for selectively rotating said legs, and means for locking said legs in position with said laterally extending portions in load-elevating position.

References Cited in the file of this patent

UNITED STATES PATENTS

| | | |
|---|---|---|
| 1,486,045 | Shuford | Mar. 4, 1924 |
| 2,461,479 | Moffat | Feb. 8, 1949 |

FOREIGN PATENTS

| | | |
|---|---|---|
| 523,868 | Germany | Apr. 29, 1931 |